(12) United States Patent
Chiba et al.

(10) Patent No.: US 6,510,609 B2
(45) Date of Patent: Jan. 28, 2003

(54) METHOD AND APPARATUS FOR ARRANGING BALLS WITH UNIFORM INTERVAL IN BALL BEARING

(75) Inventors: Kazuyasu Chiba, Fujisawa (JP); Hiroshi Shibazaki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/790,902

(22) Filed: Feb. 23, 2001

(65) Prior Publication Data

US 2001/0020330 A1 Sep. 13, 2001

(30) Foreign Application Priority Data

Feb. 25, 2000 (JP) ........................................ 2000-048709

(51) Int. Cl.[7] .............................................. F16C 43/06
(52) U.S. Cl. ............... 29/898.061; 29/464; 29/898.062; 29/724
(58) Field of Search ..................... 29/898.061, 898.062, 29/898.09, 898.064, 724, 464, 466, 467, 468

(56) References Cited

U.S. PATENT DOCUMENTS 5,678,310 A 10/1997 Chiba .................... 29/898.061

FOREIGN PATENT DOCUMENTS

| EP | 0303502 | 2/1989 |
|---|---|---|
| JP | 5-104361 | 4/1993 |
| JP | 5-104362 | 4/1993 |
| JP | 7-290329 | 11/1995 |
| JP | 11-99419 | 4/1999 |
| JP | 11-153139 | 6/1999 |

Primary Examiner—Gregory M. Vidovich
Assistant Examiner—Eric Compton
(74) Attorney, Agent, or Firm—Crowell & Moring LLP

(57) ABSTRACT

In a ball bearing having an inner ring and an outer ring independently supported in a relative displacement manner, balls are arranged by placing the balls in an annular space between the inner ring and the outer ring, placing nozzles beside the inner ring and the outer ring, the number of which is at least the same to that of the balls, making each of the nozzles face the opening on one side of the annular space between the inner ring and the outer ring, and causing stream of fluid by each of the nozzles to make the balls move circumferentially, so that the balls are arranged circumferentially with a uniform interval, wherein when the stream is caused by each of the nozzles, one of the inner and outer rings is relatively displaced with reference to the nozzles and the other ring, so that the relationship in position between the nozzles and the balls is changed.

21 Claims, 8 Drawing Sheets

METHOD AND APPARATUS FOR ARRANGING BALLS WITH UNIFORM INTERVAL IN BALL BEARING

FIELD OF THE INVENTION

The present, invention is related to a method and an apparatus for arranging balls in a ball bearing, specifically to a method and an apparatus for arranging a plurality of balls circumferentially with a uniform interval (uniform space) before the step of mounting a retainer in assembling the ball bearing.

DESCRIPTION OF THE PRIOR ART

In assembling a ball hearing comprising an inner ring 1 and an outer ring 2, at first, as shown in FIG. 7 (A), a plurality of balls 3 are installed in an annular space 4 between an inner ring raceway in the outer peripheral surface of the inner ring 1 and an outer ring raceway on the inner peripheral surface of the outer ring 2, and a plurality of the balls 3 are arranged circumferentially with a uniform interval therebetween as shown in FIG. 7 (B). Next, an annular retainer (not shown) is pushed in the annular space 4 between the inner ring raceway and the outer ring raceway so as to rotatably retain the balls 3.

When the plurality of the balls 3, installed and arranged with uneven spaces in the annular space 4 as shown in FIG. 7 (A), are arranged with the uniform interval, as shown in FIG. 7 (B), the force of the hydraulic fluid is utilized to circumferentially move each of the balls 3 while preventing the rolling surface of each of the balls 3 from being injured, which is conventionally known, for examples, in Japanese Patent Publications No. Toku Kai Hei 05-104361, or No. Toku Kai Hei 05-104362.

FIGS. 8 (A) to 8 (C) show the first example of the invention described in Japanese Patent Publication No. Toku Kai Hei 05-104362. A compressor is used to supply the compressed air, one kind of pressurized fluid, to a nozzle device 7 comprising an annular manifold 5 (refer to FIG. 10 described below, omitted in FIGS. 8(A) to 8(C)) which is connected to the discharge opening of the compressor, and nozzles 6 which are provided on one surface of the manifold 5 circumferentially with a uniform interval. The number (sixteen in the example shown) of the nozzles 6 is twice the number of the balls 3 to be arranged (eight in the example shown). Valve devices (not shown), which are electromagnetically opened and closed, are provided in the air paths communicated with the nozzles 6, respectively, and signals produced by a controller (not shown) are used to independently open and close each of the valve devices.

With the nozzle device 7 constructed as mentioned above, the balls 3 existing with uneven spaces between the outer peripheral surface of the inner ring and the inner peripheral surface of the outer ring as shown in FIG. 8 (A), are arranged with a uniform interval in the circumferential direction, as shown in FIG. 8 (C), through the steps as described below.

At first, as shown in FIG. 7 (A), the balls 3 are inserted between the inner ring raceway provided on the outer peripheral surface of the inner ring 1 and the outer ring raceway provided on the inner peripheral surface of the outer ring 2. This inserting operation is conducted in the condition that the centers of the inner ring 1 and the outer ring 2 are displaced from each other, and the width of the annular space 4 between the outer peripheral surface of the inner ring 1 and the inner peripheral surface of the outer ring 2 is increased at one circumferential portion. Accordingly, the balls 3, immediately after installed, are concentrated at the one circumferential portion. In this condition, the nozzle device 7 is placed axially beside the inner ring 1 and the outer ring 2, so that the nozzles 6 face the annular space 4 (refer to FIG. 7 (A)) between the inner ring raceway and the outer ring raceway.

Next, shown in FIG. 8 (B), by spouting the compressed air from one or some of the nozzles 6, the balls 3 are moved in the circumferential direction, so that the balls 3, are arranged circumferentially with a uniform interval as shown in FIG. 8 (C). That is to say, as shown in FIG. 9, when spouting the compressed air to one of the balls 3 from one of the nozzles 6, as clear in the Bernoulli's theory, pressure (the static pressure) acts onto the either side of the ball 3, such that it is low on the side where the nozzle 6 exists and the stream is swift, and high on the opposite side. Accordingly, the ball 3 is drawn toward the center axis of the nozzle 6. And, after the center of this ball 3 has moved on the extension line (center axis) of the nozzle 6, as long as the compressed air continues spouting from the nozzle 6, the ball 3 is sustained in the position facing the nozzle 6.

Accordingly, by proper switching between on and off in spouting the compressed air from the sixteen nozzles 6 provided in the manifold 5, the eight balls 3 are moved in the circumferential direction, so that the balls 3 are placed at the respective positions facing the respective alternate eight nozzles 6. Then the eight balls 3 are arranged circumferentially with a uniform interval.

Next, FIG. 10 shows the second example of the prior art method described in the publication. Although, in the first example shown above, the number (sixteen) of the nozzles 6 in the nozzle device 7 is twice the number (eight) of balls 3 to be arranged, in this example, the number of the nozzles 6 in the nozzle device 7a is equal to the number (eight) of the balls 3. Instead, the manifold 5, which forms the nozzle device 7a together with the nozzles 6, is rotatable in either of the circumferential directions, as shown by the arrow 'X' in FIG. 10.

In the case of arranging the balls 3 circumferentially with a uniform interval by the second example method using the nozzle device 7a, the compressed air is spouted from one or some of the plurality of the nozzles 6, while the manifold 5 is rotated in the circumferential direction, clockwise and counterclockwise, so that every ball 3 is retained in the position facing each of the eight nozzles 6. In this case, by properly regulating the speed and the angle of rocking of the manifold 5, it is prevented that two or more balls 3 are kept to be attracted to one nozzle 6. That is, the extra balls 3 are shaken off.

Moreover, as a method for the purpose of the more smooth operation for arranging a plurality of balls by compressed fluid, Japanese Patent Publication No. Toku Kai Hei 07-290329 (US 5,678,310) disclosed a method using the apparatus as shown in FIG. 11 or FIG. 12. With the third and fourth examples described as prior art methods in this publication, in the third example using the apparatus as shown in FIG. 11, a positioning land 9 is formed at the upper center portion of a mounting block 8 functioning as the manifold, and the inner ring 1 is fitted without play onto the positioning land 9. Then, the compressed air, or the pressurized fluid is spouted out of the upper opening of each of the nozzles 6 around this positioning land 9 to the annular space 4 existing between the outer peripheral surface of the inner ring 1 and the inner peripheral surface of the outer ring 2. The number of the nozzles 6 is the same to that of the balls 3.

Further, in this example, no special device such as electromagnetic valve is provided between each of the nozzles 6 and the air supplying path 11 communicated with the source of the compressed air, such as the compressor 10. Consequently, while opening the electromagnetic valve, not shown, which is provided between the air tank attached to the compressor 10 and the air supplying path 11, the same amount of the compressed air is spouted at the same velocity from each of the nozzles 6.

And, above the upper opening of the annular space 4, a rod 14 is hung, and a disturbance plate 12 is connected to the lower end of the rod 14. The annular disturbance plate 12 is provided, so that the sloped lower surface 13 of this disturbance plate 12 faces to the upper end opening of the annular space 4. The disturbance plate 12 can freely rise, descend, rotate and rock. Consequently, the distance between the lower surface 13 of the disturbance plate 12 and the upper end of the inner ring 1 and the outer ring 2 is freely altered with respect to the circumferential direction.

Utilizing the apparatus as described above, the operation of circumferentially arranging the balls 3, just inserted into the annular space 4, with a uniform interval are conducted as follows.

At first, as shown in FIG. 7 (A) explained above, the ball bearing having the balls 3 arranged into the annular space 4 with uneven spaces is mounted onto the upper surface of the mounting block 8 as shown in FIG. 11. Then, while compressed air is spouted from the nozzles 6, the disturbance plate 12 is moved in the proper direction.

While spouting the compressed air from the nozzles 6, by moving the disturbance plate 12, that is by making the disturbance plate 12 rotate, rise, descend and rock, the balls 3 existing in the annular space 4 in a cluster state can be separated from each other. For example, as shown in FIG. 13, when three balls 3 are caught by a pair of nozzles 6 adjacent to each other, by making the disturbance plate 12 rotate, rise, descend and rock, one part of the lower surface 13 comes closer to the balls 3, and the stream of the pressurized air spouted from the pair of nozzles 6 is disturbed, so that the three balls 3 are separated from each other. Accordingly, like the first and second examples in the prior art method shown in FIGS. 8 thru 10 mentioned above, each of the nozzles 6, individually retains one of the balls 3.

Next, in the case of the fourth example of the prior art method using the apparatus shown in FIG. 12, at the lower surface 13 of the disturbance plate 12, a plurality of third nozzles 15 are provided. The number of the nozzles 15 may not be the same to that of the balls 3 to be arranged, and the nozzles 15 may not be provided circumferentially with a uniform interval. In order to arrange the balls 3, just inserted in the annular space 4, circumferentially with a uniform interval, at the same time when or, after or before spouting the compressed air from each of the nozzles 6, compressed air is spouted from each of the nozzles 15. And, as necessary, the disturbance plate 12 is made to rotate, rise, descend and rock. Consequently, the operation of separating the balls 3 which are close to each other is efficiently conducted.

In the case of the prior art method described above, as shown in FIG. 13, a long time of operation is required in separating certainly the three or more balls 3 which are provided close to each other, and arranging them with the uniform space. Consequently, in order certainly to arrange three or more balls 3 with a uniform interval in the automatic assembling process, the continuing time of spouting the compressed air must be long. As a result, the assembling efficiency of the ball bearing decreases, and moreover the consumption of the compressed air increases, which causes the higher cost of assembling the ball bearing.

On the other hand, shortening the continuing time would make high the possibility of the balls 3 entering the next retainer assembling process before they are arranged with a uniform interval, which would make high the trouble occurrence frequency in this process, and therefore could not be adopted. Specifically, even if the trouble frequency is very low, the trouble, once occurred, would make the producing efficiency remarkably worse in the mass-production, and therefore the trouble frequency needs to be as nearly zero as possible. At this respect, the prior art method mentioned above must still be improved.

Concerning the cause of the trouble occurrence mentioned above, the present inventors considered as follows: That is to say, with every prior art method, the inner ring 1 and the outer ring 2 for the ball bearing are placed together on the same mounting block 8. Consequently, in the operation of arranging the balls 3 with a uniform interval, the position relationship of the inner ring 1 and the outer ring 2 is not changed. On the other hand, in order to conduct this process, when mounting the ball bearing on the mounting block 8, the position relationship between the inner ring 1 and the outer ring 2 is slightly changed, and the space between the inner ring raceway provided on the outer peripheral surface of the inner ring 1 and the outer ring raceway provided on the inner peripheral surface of the outer ring 2, may be narrower at one portion of the circumferential direction, although slightly. Consequently, at the narrower portion like this, the frictional force acting at the contact position between each of the raceways and the rolling surface of the balls 3 increases. As a result, in the narrower space portion between the raceways, as mentioned above, three or more balls 3 are inclined to get together as shown at the lower left portion and the upper right portion in FIG. 13, and they are not easily separated.

The method of arranging the balls circumferentially with a uniform interval by using the pressurized fluid, other than in the two publications mentioned above, is disclosed in Japanese Patent Publications Nos. Toku Kai Hei 05-104361, 11-99419 or 11-153139 are known. Among them, the method described in Japanese Patent Publication No. Toku Kai Hei 11-99419 is substantially the same to the method described in No. Toku Kai Hei 07-290329 (US 5,678,310) mentioned above and has the same problem. And with the method described in No. Toku Kai Hei 05-104361, in the operation of arranging the balls circumferentially with a uniform interval, the balls are left under the condition that the preload is applied to them based on the weight of the inner ring. Consequently, the surface pressure at the contact portion between the rolling surface of each of the balls and the inner and outer ring raceways correspondingly increases, then the balls are hardly separated in the circumferential direction of the raceways.

Further, in the case of the method described in Japanese Patent Publication No. Toku Kai Hei 11-153139, as the downstream end of the nozzle is formed in a two-tip-fork or a horn shape, the force based on the dynamic force of the compressed air spouted from the downstream end has a component of force in circumferential direction. However, in the case of the method described in Publication No. Toku Kai Hei 11-153139, as the shape of the downstream end of the nozzle is symmetrical with respect to the circumferential direction, depending on the position relationship between the balls close to each other and the nozzles, the balls may be hardly separated.

In viewing such circumstances, this invention was attempted to realize the method and apparatus for positively arranging a plurality of balls with a uniform interval in a short time.

SUMMARY OF THE INVENTION

An object of the present invention is to provide a method and an apparatus for arranging a plurality of balls in a ball bearing circumferentially with a uniform interval without injuring the balls, wherein an inner ring and an outer ring of the ball bearing are independently mounted to an inner ring mounting block and an outer ring mounting block, respectively, and pressurized air is spouted from a plurality of nozzles, such that by the force of this pressurized air, the balls are moved to face the nozzles, respectively.

DETAILED DESCRIPTION OF THE PREFERRED EMBODIMENTS

Figure 1:
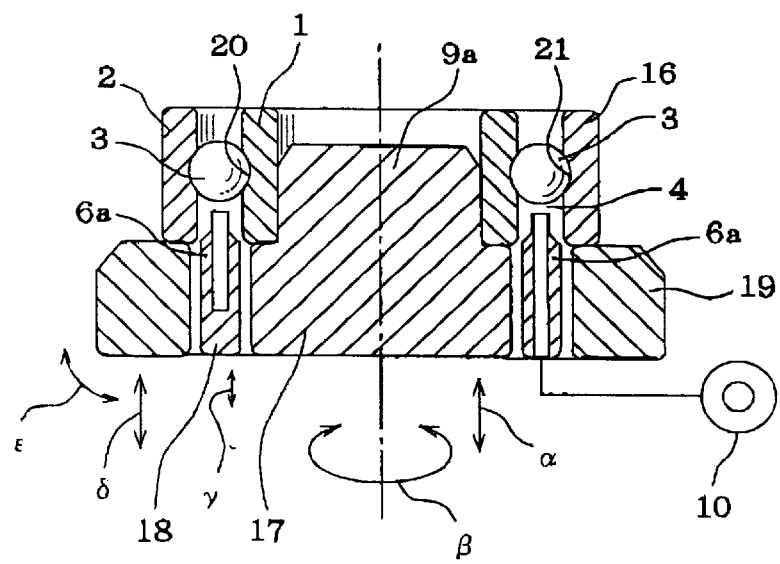
FIG. 1 is a cross sectional view of a first example of embodiment of this invention for arranging balls in a ball bearing.

According to this invention, a method and an apparatus for arranging balls circumferentially with a uniform interval in a ball bearing are provided, wherein a plurality of balls are mounted between an inner ring raceway on the outer peripheral surface of an inner ring and an outer ring raceway on the inner peripheral surface of an outer ring, wherein a nozzle device having nozzles the number of which is the same to or more than the number of the balls is provided beside the inner ring and the outer ring, wherein each of the nozzles is provided to face the opening on one side of the annular space between the inner ring raceway and the outer ring raceway, and wherein a stream of fluid is caused by each of the nozzles, so that the stream is used to make the balls move in the circumferential direction so as to arrange the balls circumferentially with a uniform interval.

Especially, in the method and apparatus in a first feature of the present invention, the inner ring and the outer ring are independently supported in a relative displacement relationship, such that the stream caused by each of the nozzles makes one of the outer and inner rings relatively displace with reference to the nozzles and the other ring to change the relationship in position between each of the nozzles and the balls, so that the balls mounted close to each other between the inner ring raceway and the outer ring raceway are separated from each other, whereby smooth movement of each of the balls in the circumferential direction is achieved.

Furthermore, in the method and apparatus in a second feature of the present invention, a plurality of second nozzles different from the first nozzles causing the stream of the fluid in a direction tilted with reference to the circumferential direction are provided at the opposite side to the nozzles as previously mentioned, with respect to the axial direction of the inner ring and the outer ring with the balls therebetween, the stream of the fluid caused by the second nozzles forces the balls to move in the circumferential direction, so that the balls mounted close to each other between the inner ring raceway and the outer ring raceway are separated from each other, whereby smooth movement of each of the balls in the circumferential direction is achieved.

By a method and an apparatus for arranging balls circumferentially with a uniform interval in a ball bearing as mentioned above, in the case where a plurality of balls are provided close to each other between the inner ring raceway and tho outer ring raceway, the operation arranging the respective balls circumferentially with a uniform interval is efficiently conducted.

Firstly, by a method and an apparatus for according to the first feature, the relative displacement of the inner ring and the outer ring can change the position relationship of the inner ring and the outer ring while moving the plurality of balls.

And, by a method and an apparatus for according to the second feature, the force of the pressurized fluid caused by the second nozzles can move the balls to the circumferential direction with respect to the inner ring and the outer ring.

Correspondingly, the friction force, acting on the contact position between the rolling surface of the balls and the inner ring raceway on the outer peripheral surface of the inner ring and the outer ring raceway on the inner peripheral surface of the outer ring, decreases, and each of the balls can easily move in the circumferential direction along the both raceways. Accordingly, by the force of the pressurized fluid spouted from the nozzles, the balls can be separated from each other, and the operation of arranging the balls circumferentially with a uniform interval can easily be conducted.

In another feature of the present invention, an apparatus for arranging balls circumferentially with a uniform interval in a ball bearing comprises a means for independently supporting an inner ring and an outer ring for the ball bearing in a relative displacement manner, a means for placing a plurality of balls in an annular space between an inner ring raceway on an outer peripheral surface of the inner ring and an outer ring raceway on an inner peripheral surface of the outer ring, a nozzle device placed beside the inner ring and the outer ring, and having nozzles the number of which is at least the same to that of the balls, the nozzles arranged to face the opening on one side of the annular space between the inner ring raceway and the outer ring raceway, a means for causing a stream of fluid through each of the nozzles to make the balls move circumferentially, wherein when the stream of fluid is caused through each of the nozzles, one of the inner and outer rings is adapted to be relatively displaced with reference to the nozzles and the other ring, so that the relationship in position between the nozzles and the balls is changed.

FIG. 1 shows a first example of embodiment of this invention, wherein the ball bearing 16 comprises an inner ring 1 and an outer ring 2. In the apparatus for arranging the balls circumferentially with a uniform interval in this example of embodiment, an inner ring mounting block 17 is provided to mount the inner ring 1 of the ball bearing 16 onto the upper surface thereof, and a nozzle device 18 and an outer ring mounting block 19 are concentrically provided around the inner ring mounting block 17 in that order from the inner ring mounting block 17.

A positioning land 9a is formed on the upper surface of the inner ring mounting block 17 at its center, and the inner ring 1 is mounted on the upper surface of the inner ring mounting block 17 near the outer periphery thereof.

And, the inner ring mounting block 17, the nozzle device 18 and the outer ring mounting block 19 can freely move for independent displacement. In this example of embodiment, the inner ring mounting block 17 can rise, descend, rotate and rock as shown with Arrows α, β. The nozzle device 18 can rise and descend as shown with Arrow γ. The outer ring mounting block 19 can rise, descend, rotate and rock as shown with Arrows δ, ε. In order to make the displacements shown with Arrows α, β, γ, δ and ε independently, a driving device, not shown in figures, is provided.

Figure 8A:
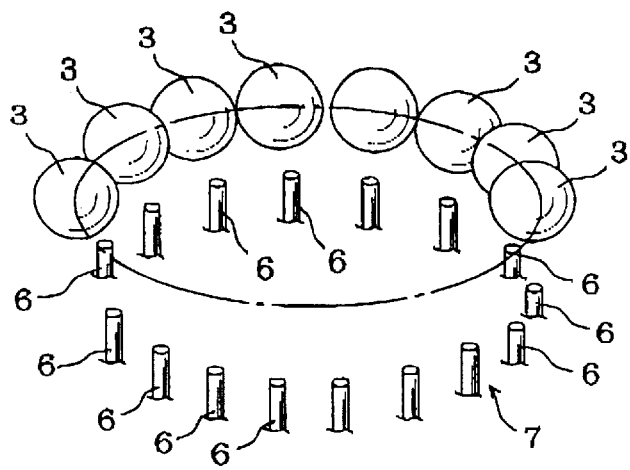
FIGS. 8 (A) to 8 (C) are a perspective view showing the balls and nozzles in the sequential steps in the first example of the prior art method described in Japanese Patent Publication No. Toku Kai Hei 05-104362.
Figure 8B:
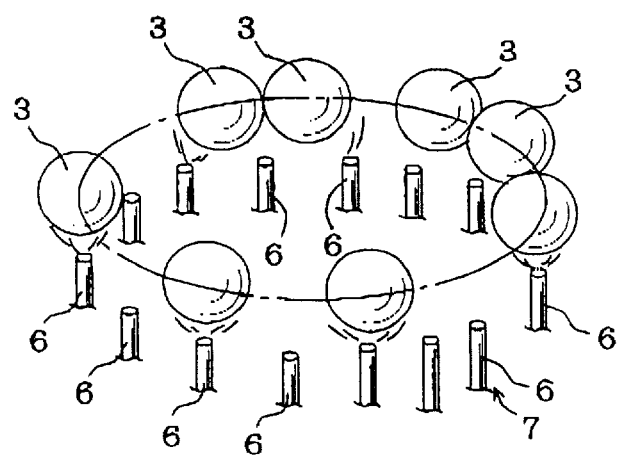
Figure 8C:
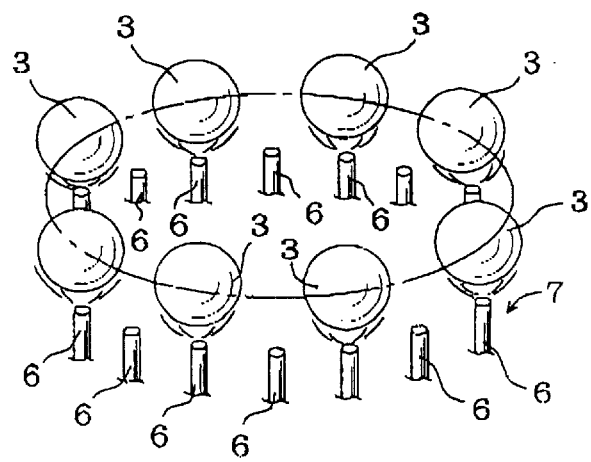
Figure 9:
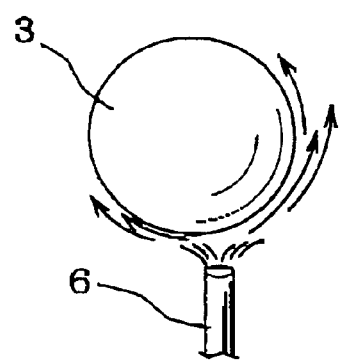
FIG. 9 is a perspective view showing a ball attracted by a nozzle.
Figure 10:
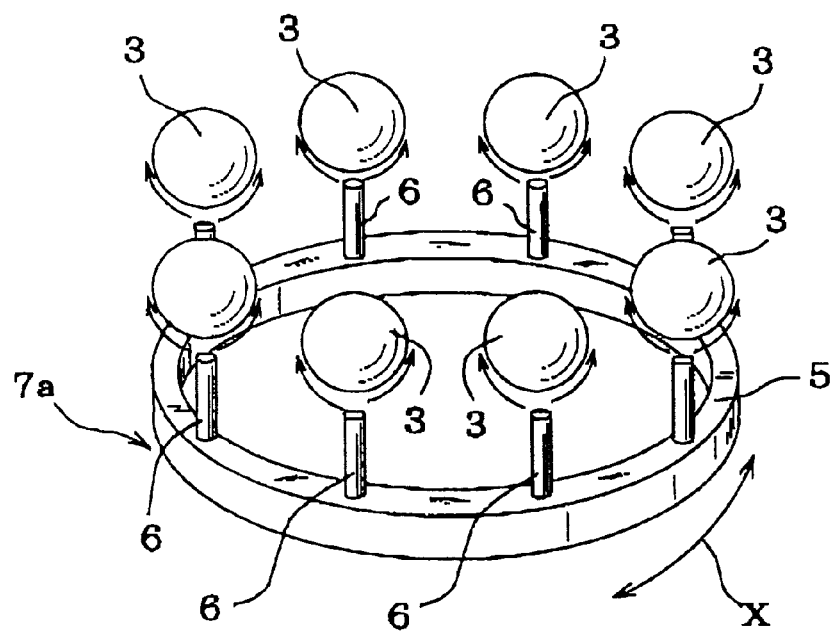
FIG. 10 is a perspective view showing the balls and nozzles with a manifold in the second example of the prior art method described in the Publication.

Furthermore, the nozzle device 18 contains a plurality of nozzles 6a, so that pressurized fluid, specifically compressed air is supplied from a source of compressed air, for example the compressor 10, to each of the nozzles 6a. Further, the number of the nozzles 6a is to be an integer multiple of the number of the balls 3 to be arranged with a uniform interval, as in the first example of the prior art structure shown in FIG. 8 as mentioned above, or is to be equal to the number of the balls 3 to be arranged with a uniform space, as in the second example of the prior art structure shown in FIG. 10 as mentioned above.

In each of the cases, an electromagnetic valve is provided on the way through the air path from the compressor 10 to the nozzles 6a, so that the pressurized air spouted from the tip of the nozzles 6a can be freely controlled in supply and stop.

Further, it is preferable that an electromagnetic valve for opening and closing is independently mounted to each of the nozzles 6a in order to control in a subtle manner, but in the case where the number of the nozzles 6a is equal to the number of the balls 3, the electromagnetic valve need not be independently provided for each of the nozzles 6a. In other words, if the number of the nozzles 6a is equal to the number of the balls 3, the start and stop in spouting the pressurized air at the tip of the nozzles 6a can be simultaneously conducted for all the nozzles to the balls 3 to arrange them circumferentially with a uniform interval.

With the apparatus for arranging the balls circumferentially with a uniform interval shown in FIG. 1, the balls 3 provided between the inner ring raceway 20 on the outer peripheral surface of the inner ring 1 and the outer ring raceway 21 on the inner peripheral surface of the outer ring 2 are arranged circumferentially with a uniform interval as follows.

First, the inner ring 1 is fitted around the positioning land 9a provided on the upper surface of the inner ring mounting block 17 and mounted on the upper surface of the outer periphery of the inner ring mounting block 17, while the outer ring 2 is mounted on the outer ring mounting block 19. With this condition, the tip portion (upper end) of each of the nozzles 6a of the nozzle device 18 is inserted into the lower end of the annular space existing between the outer peripheral surface of the inner ring 1 and the inner peripheral surface of the outer ring 2.

With this condition, in order to arrange the balls 3 circumferentially with a uniform interval with respect to the raceways 20, 21, compressed air is continuously or intermittently spouted from each of the nozzles 6a, while at least one of the inner ring mounting block 17 and the outer ring mounting block 19 is displaced. At the same time, as required, the nozzle device 18 is made to rise and descend. Incidentally, the displacement of the mounting blocks 17, 19 is attempted to prevent the situation that the contact portions between the rolling surface of the balls 3 and the raceways 20, 21 are stabilized under the high contact pressure condition. And therefore, the amount of the displacement can be slight, for example, in the degree of vibration.

On the contrary, the displacement of the nozzle device 18 (rising and descending) is attempted to change the compressed air condition on the balls 3 so as to easily move the balls 3 in the circumferential direction. The amount of displacement is approximately several millimeters.

Furthermore, so long as the displacements of the members 17 thru 19 causes the relative displacement of the inner ring 1 and the outer ring 2, the displacement of either member is mostly sufficient (Compared with the prior art method, the arrangement of the balls 3 in the circumferential direction with a uniform interval is certainly achieved). Accordingly, at least one of the two mounting blocks 17, 19 may be displaced in one of the directions to achieve the purpose. However, for the certain arrangement of the balls 3 in the circumferential direction with a uniform interval under any conditions at mass-production, it is desirable that all the members 17 thru 19 are displaced with reference to each other to certainly move the balls 3 in the circumferential direction.

As mentioned above, the relative displacement of the inner ring 1 and the outer ring 2 is caused by the displacements of the members 17 thru 19, while the compressed air is spouted from the nozzles 6a of the nozzle device 18, so that the adjacent balls 3 are separated from each other between the two raceways 20, 21 to efficiently arrange the balls 3 circumferentially with a uniform interval.

Moreover, with the method of this invention, by displacing any one of the two blocks 17, 19 in either direction to cause the relative displacement of the inner ring 1 and the outer ring 2, the position relationship of the inner ring 1 and the outer ring 2 is changed, and at the same time, the balls 3 are rolled.

Consequently, the friction force acting on the contact portions between the rolling surface of the balls 3, and the inner ring raceway 20 provided on the outer peripheral surface of the inner ring 1 and the outer ring raceway 21 provided on the inner peripheral surface of the outer ring 2 decreases.

Specifically, when mounting the ball bearing 16 on the mounting blocks 17 and 19, the position relationship of the inner ring 1 and the outer ring 2 is changed in a subtle manner, and the space between the inner ring raceway 20 and the outer ring raceway 21 becomes narrow in one location in the circumferential direction, and even if, at this location, the friction force acting on the contact portions between the raceways 20, 21 and the rolling surface of the balls 3, becomes large, the displacement of any one of the mounting blocks 17, 19 would cancel the condition that the friction force has increased like this.

And, the movement of the balls 3 with respect the inner ring raceway 20 and the outer ring raceway 21 causes the transition of the friction force acting on the contact portions from the one based on the relatively large static coefficient of friction to the one based on the relatively small coefficient of dynamic friction.

Accordingly, the balls 3 becomes easy to be displaced in the circumferential direction of the raceways 20, 21. Consequently, like the prior art method mentioned above, the force of the compressed air spouted from the nozzles 6a makes the balls 3 to be arranged with a uniform interval in the circumferential direction of the raceways 20, 21.

The present invention is characterized in efficiently separating the gathered balls 3 from each other, and the action when arranging the separated balls 3 circumferentially with a uniform interval is substantially the same to that of the prior art methods, and so the duplicated explanation is omitted.

Further, in the case of working the invention in the first feature, the nozzle device 18 can be combined with and fixed to the inner ring mounting block 17 or the outer ring mounting block 19 in one body. In short, it is sufficient that the two mounting blocks 17, 19 can be relatively displaced with reference to each other.

Figure 2:
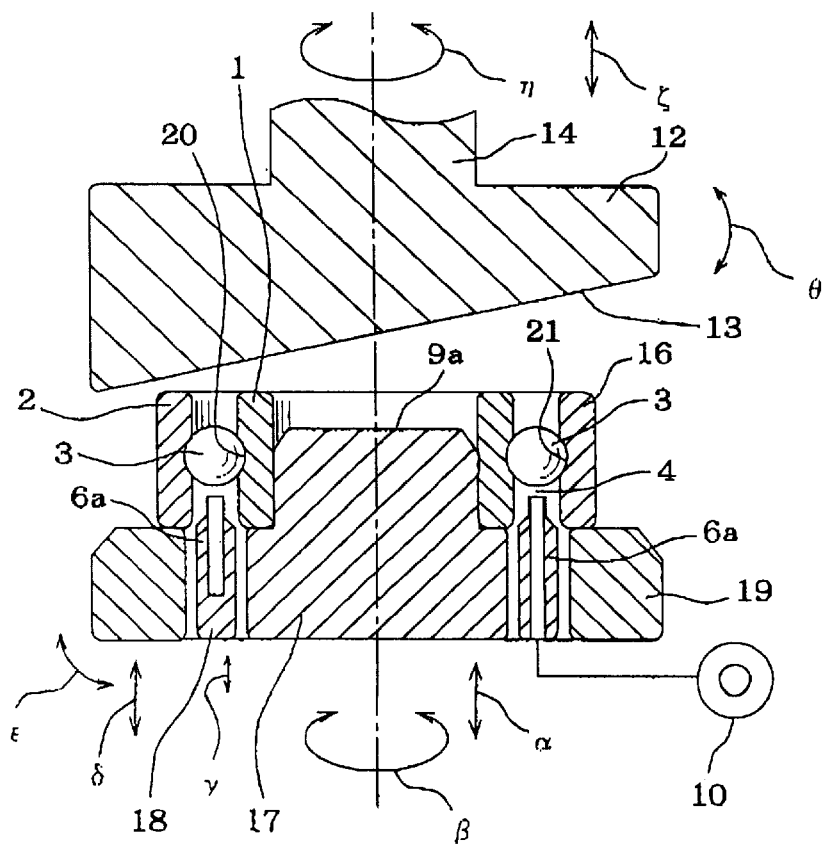
FIG. 2 is a partly cut-away, cross sectional view of a second example of embodiment of this invention for arranging balls in a ball bearing.

Next, the FIG. 2 shows a second example of embodiment of the first feature of this invention like above. In the apparatus for arranging the balls circumferentially with a uniform interval in this example of embodiment, the ball bearing 16 is mounted on the upper surface of the outer periphery of the inner ring mounting block 17 and on the upper surface of the inner periphery of the outer ring mounting block 19, and a disturbance plate 12 is provided above the ball bearing 16, which is similar to the third example of embodiment of the prior art method shown in FIG. 11 mentioned above. This disturbance plate 12 as in the third example of embodiment of the prior art method is free in rising and descending in the direction of Arrow ζ in FIG. 2, rolling in the direction of Arrow η in FIG. 2 and rocking in the direction of Arrow θ in FIG. 2.

In the case of this example of embodiment, the inner ring mounting block 17, the outer ring mounting block 19 and the nozzle device 18 are displaced in the directions of Arrows α thru ε as shown in FIG. 2, while the disturbance plate 12 is displaced to the directions of Arrows ζ thru θ, and in this state, compressed air is spouted from each of the nozzles 6a of the nozzle device 18. In the case of this example of embodiment, the stream of air, which is spouted from each of the nozzles 6a, moves the balls 3 and the air is disturbed when it reaches above the balls 3. Further, this air disturbance makes the balls 3 easy to be moved, so that the arrangement of the balls 3 in the circumferential direction with a uniform interval is secured.

This example of embodiment is different from the first example of embodiment only in the point of providing the disturbance plate 12, and in the other portions, substantially the same to the first example of embodiment, then like members are similarly numbered and the duplicated explanation is omitted.

Further, the lower surface of the disturbance plate provided above the ball beating 16 is not necessarily formed in the slope surface tilted in one direction, as shown in a figure. For example, it can be formed in a shape having a plurality of slopes or in the shape which functions as the upper guide of the ball bearing 16.

Furthermore, it is accepted that the lower surface of the disturbance plate is flat with a sloped ditch provided on this lower surface, so that the air which has entered into this sloped ditch is flown in a predetermined direction to cause the air disturbance.

Figure 3:
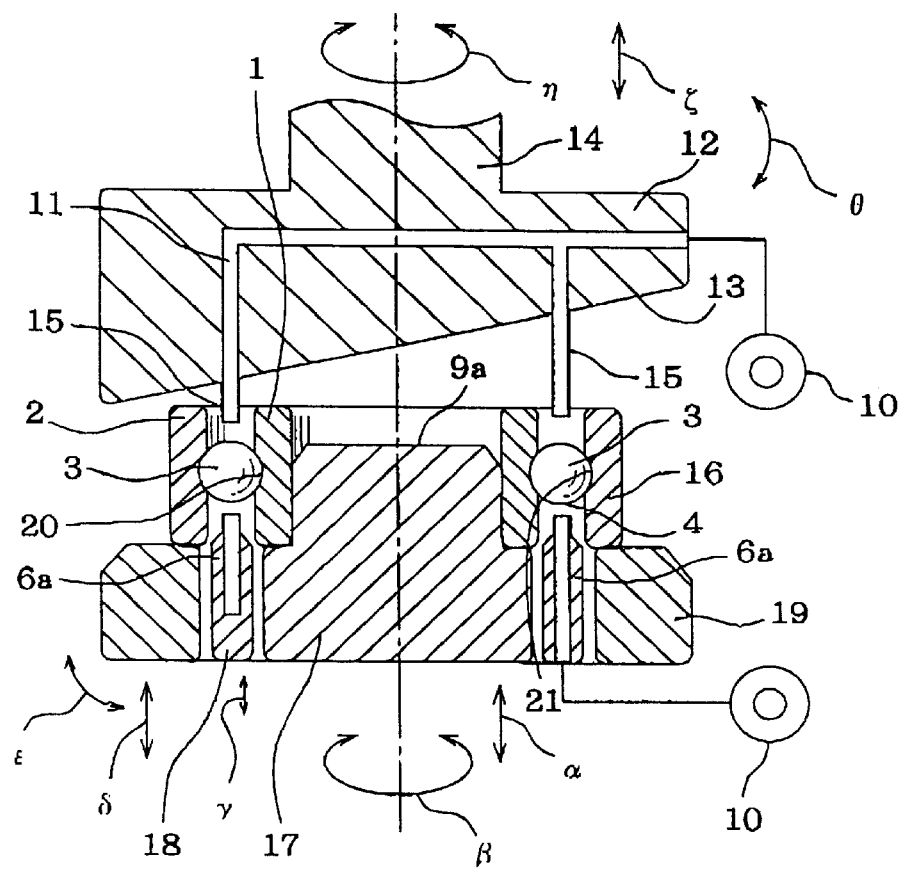
FIG. 3 is a partly cut-away, cross sectional view of a third example of embodiment of this invention for arranging balls in a ball bearing.

Next, FIG. 3 shows a third preferred example of embodiment according to the first feature of this invention. In the apparatus for arranging balls circumferentially with a uniform interval for this example of embodiment, a plurality of third nozzles 15 are provided to the lower surface 13 of the disturbance plate 12 provided above the ball bearing 16 mounted on the upper surface of the inner ring mounting block 17 and the outer ring mounting block 19, like the fourth example by the prior art method shown in FIG. 12. The number of these nozzles 15 is not to be the same to the number of balls 3 to be arranged, like the fourth example by the prior art method, and there is no need of arranging the balls circumferentially with a uniform interval.

But, as the third nozzles 15 function differentially by its number, and based on the relationship with the nozzles 6a of the nozzle device 18 mentioned below, the timing of spouting the compressed air is changed. That is to say, when the nozzles 15, the number of which is equal to that of the balls 3, are provided circumferentially with a uniform interval, they cooperate with the nozzle 6a to arrange the balls 3 circumferentially with a uniform interval. Accordingly, the timing of spouting the compressed air from each of the nozzles 6a is related with the timing of spouting the compressed air from the third nozzles 15. For example, they are simultaneously started and stopped for spouting.

On the other hand, when the number of the third nozzles 15 is not equal to that of the balls 3 (or when the number of the third nozzle 15 is equal to that of the balls, but the third nozzles 15 are provided circumferentially with different intervals), the compressed air spouted from those third nozzles 15, together with the lower surface 13 of the disturbance plate 12, disturbs the air stream of the compressed air spouted from each of the nozzles 6a, and functions to move the closely adjacent balls 3 to be separated from each other in the circumferential direction. Consequently, the timing of spouting the compressed air from each of the nozzles 6a need not be related with the timing of spouting the compressed air from the third nozzles 15 (they are simultaneously started and stopped for spouting).

In the case of this example of embodiment, in order to circumferentially arrange the balls 3 just inserted with a uniform interval in the annular space 4, the compressed air is spouted from each of the nozzles 6a of the nozzle device 18 provided below the ball bearing 16, simultaneously or after or before it, the compressed air is spouted from the third nozzles 15. And, as required, the disturbance plate 12 is made to rotate, rise, descend and rock. Consequently, the operation of separating the closely adjacent balls 3 from each other is more efficiently conducted.

Further, in working this example of embodiment, the lower surface of the disturbance plate 12 is not necessarily sloped and may be flat in parallel to the ball bearing 16.

The other portions of the structure and the functions are substantially the same to those of the second example of embodiment, and therefore like members are indicated by like symbols and the duplicated explanation is omitted.

Figure 4:
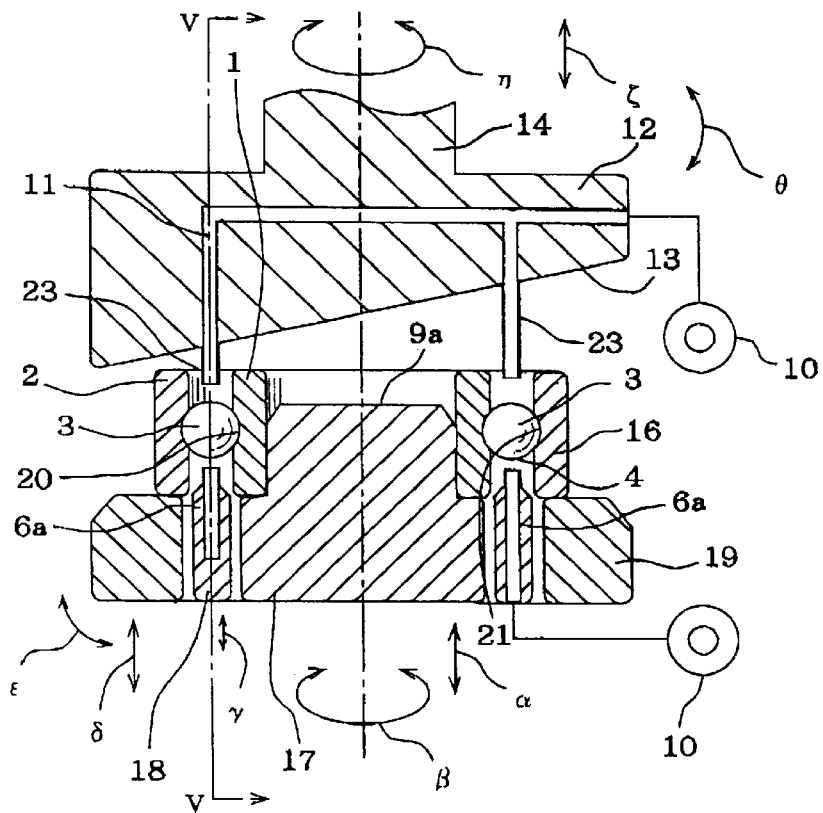
FIG. 4 is a partly cut-away, cross sectional view of a fourth example of embodiment of this invention for arranging balls in a ball bearing.
Figure 5:
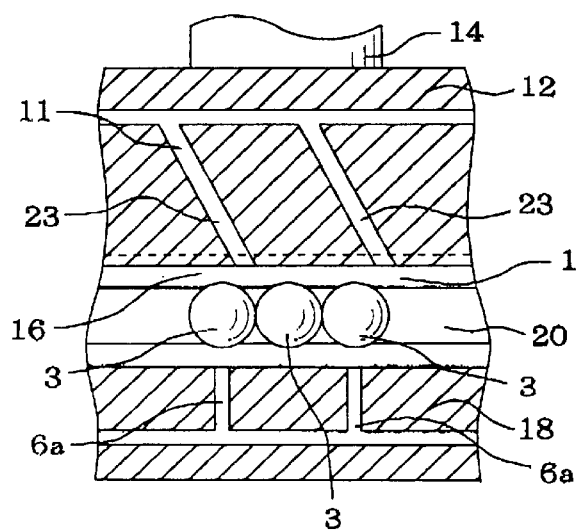
FIG. 5 is a partly cut-away, cross sectional view taken along the line V—V in FIG. 4.

Next, FIG. 4 and FIG. 5 show a fourth example of embodiment of this invention, correspondent to the first and second features. In the apparatus of arranging the balls circumferentially with a uniform interval for this example of embodiment, a plurality of second nozzles 23 are provided on the lower surface 13 of the disturbance plate 12 provided above the ball bearing 16 mounted on the upper surface of the inner ring mounting block 17 and the outer ring mounting block 19.

These second nozzles 23, different from the third nozzles 15 (FIG. 3) mentioned above, slope to the circumferential direction of the ball bearing 16. The number of the second nozzles 23 is equal to that of the balls 3 to be arranged, and the second nozzles 23 are arranged circumferentially with a uniform interval. The disturbance plate 12 is made to freely rotate, rise, descend and rock.

For the purpose of arranging the balls 3 of the ball bearing 16 circumferentially with a uniform interval by the apparatus containing the second nozzles 23, the compressed air is, simultaneously or one after another intermittently from one or both, spouted from the second nozzles 23 and from the nozzles 6a of the nozzle device 18 provided below the ball bearing 16, and from one side or both sides.

With the compressed air spouted from each of these nozzles 23, 6a, the force based on the dynamical pressure of the compressed air from the second nozzles 23 contains a component of force in the circumferential direction of the ball bearing. Accordingly, the displacement of each of the balls 3 to the circumferential direction of the ball bearing 16 is certainly started.

Moreover, the number of the second nozzle 23 is equal to that of the balls 3, and the second nozzles 23 are provided circumferentially with a uniform pitch, then the forces of the compressed air spouted to the adjacent balls 3 from the second nozzles 23, are different from each other unless the balls 3 are provided circumferentially with a uniform interval. Accordingly, in the state when the balls 3 are closely adjacent to each other, the balls 3 are separated from each other by the force of the compressed air spouted from the second nozzles 23.

Like this, after the balls 3 are separated from each other, the spouting of compressed air is stopped from the second nozzles 23 and the compressed air is spouted only from the nozzles 6a of the nozzle device 18 provided below the ball bearing 16. Consequently, by the force of the compressed air spouted from the nozzles 6a, the balls 3 are retained just above the nozzles 6a, respectively.

Further, in this example of embodiment, in order to be the structure corresponding not only to the first feature, but also to the second feature, the inner ring mounting block 17, the nozzle device 18 and the outer ring mounting block 19 are provided to be freely independently displaced. Accordingly, in the structure of this example of embodiment, the operation of arranging the balls 3 circumferentially with a uniform interval is more efficiently and shortly conducted. The other portions in structure and function are substantially the same to those of the third example of embodiment.

Further, in working this example of embodiment, a single electromagnetic valve can be used, so that the compressed air to all of the second nozzles 23 is simultaneously controlled in start and stop of supply. Or, one electromagnetic valve is provided for each of the second nozzles 23, the number of which is equal to that of the balls 3, then the compressed air is controlled in start and stop of supply independently for each of the second nozzles 23. In the latter method, the second nozzles 23 are sequentially changed over with respect to the circumferential direction to spout the compressed air, changing the spouting direction of the compressed air, the aimed ball 3 is moved to the circumferential direction.

In addition, the second nozzles 23 adjacent to each other in the circumferential direction are sequentially operated with respect to the circumferential direction for spouting the compressed air so as to move the balls simultaneously in the circumferential direction.

Like this, at the same time when the compressed air is spouted from the second nozzles 23, or after the balls 3 are separated from each other by spouting the compressed air from those second nozzles 23, as mentioned above, the balls 3 are retained just above the nozzles 6a, respectively, by the force of the compressed air spouted from the nozzle 6a of the nozzle device 18. The operation of spouting the compressed air from the second nozzles 23 and the nozzles 6a in the associated manner as mentioned above can be achieved by the electromagnetic valves for starting and stopping of supplying the compressed air which are controlled by any sequences.

Further, if the sequence of start and stop in supplying the compressed air is always fixed in a specific state, instead of the electromagnetic valves, a rotary valve comprising a plurality of the ports for supplying and exhausting, can be used to control the start and stop in supplying the compressed air.

Further, in the case of the example of embodiment shown in FIG. 4 and FIG. 5, the inner ring mounting block 17 and the outer ring mounting block 19 are provided, such that the inner ring 1 and the outer ring 2 for the ball bearing 16 are independently mounted on the upper surface of the both blocks 17, 19. Accordingly, in this example of embodiment, the compressed air is spouted from the second nozzles 23 and at the same time, the both blocks 17, 19 are relatively displaced, so that the balls 3 are smoothly separated from each other.

Figure 11:
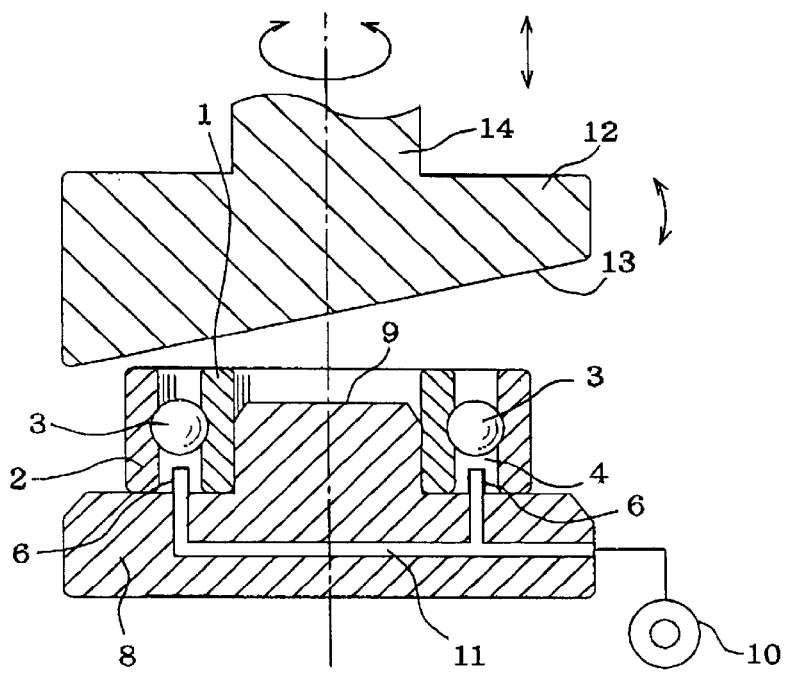
FIG. 11 is a cross sectional view showing the third example of the prior art method described in Japanese Patent Publication No. Toku Kai Hei 07-290329 (U.S. Pat. No. 5,678,310).
Figure 12:
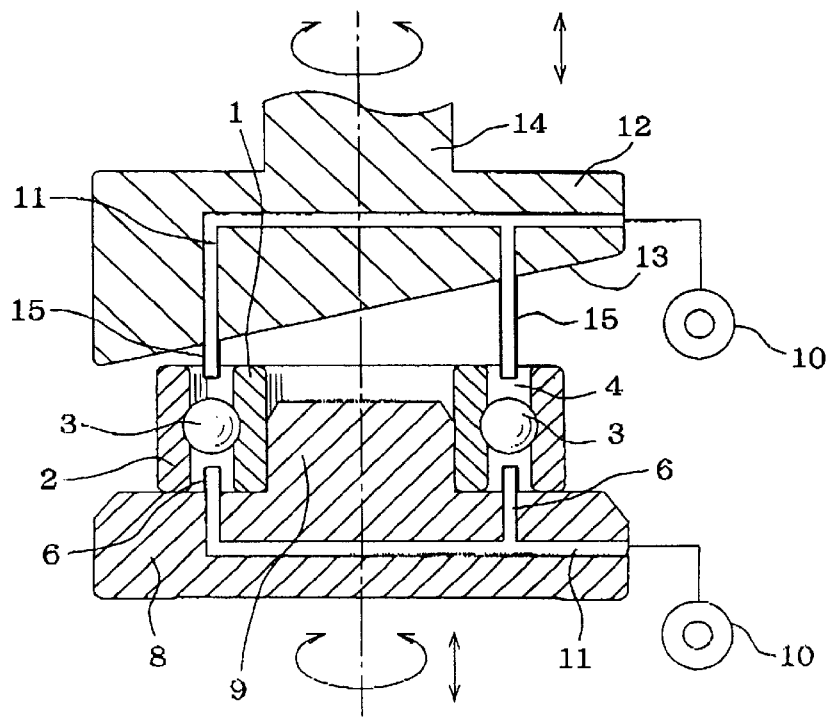
FIG. 12 is a cross sectional view showing the fourth example of the prior art method described in the Publication for arranging balls in a ball bearing.
Figure 13:
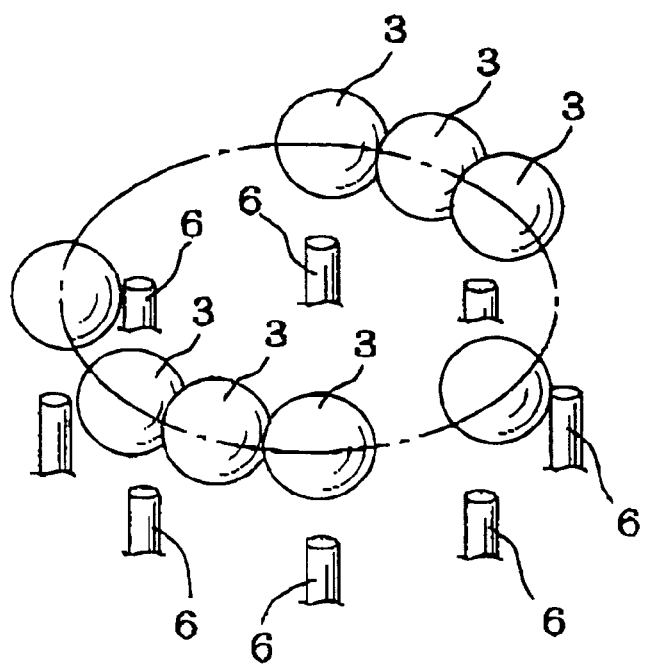
FIG. 13 is a perspective view to show balls and nozzles in the condition where the balls are not smoothly arranged.

But, in working the invention in the second feature, the ball bearing 16 may be mounted on the upper surface of the single mounting block 8 as in the prior art example shown in FIG. 11 and FIG. 12.

On the other hand, there is a case where even if the nozzle device 18 containing nozzles 6a provided below the ball bearing 16 is canceled, the balls 3 are circumferentially arranged with a uniform interval only with the compressed air spouted from the second nozzles 23. But, as the force based on the dynamic pressure of the compressed air spouted from the second nozzles 23 contains a component of force in the circumferential direction, the stabilized positioning of the balls 3 is hardly achieved. Accordingly, in working the example of embodiment in the second feature, the both mounting blocks 17, 19 are not necessarily required, but the nozzle device 18 is surely required. And, the lower surface 13 of the disturbance plate 12 is not necessarily sloped and may be flat in parallel to the ball bearing 16.

Further, the ball bearing 16 may be mounted on the upper surface of the single mounting block 8, such that both of this mounting block 8 and the disturbance plate 12 are fixed.

Figure 6:
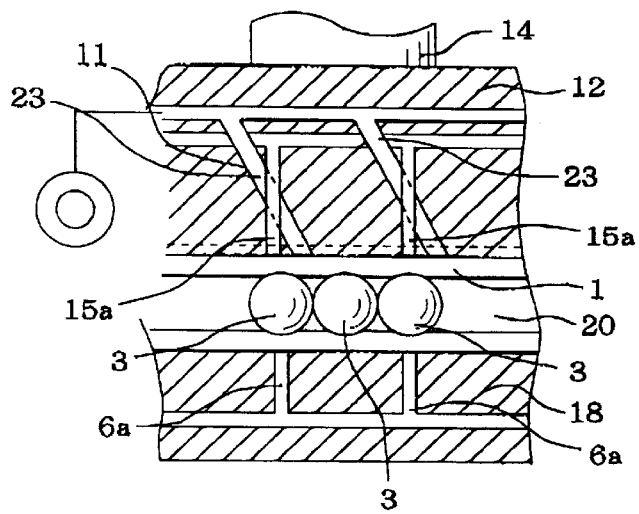
FIG. 6 is a partly cut-away, cross sectional view of a fifth example of embodiment of this invention, similar to FIG. 5.
Figure 7:
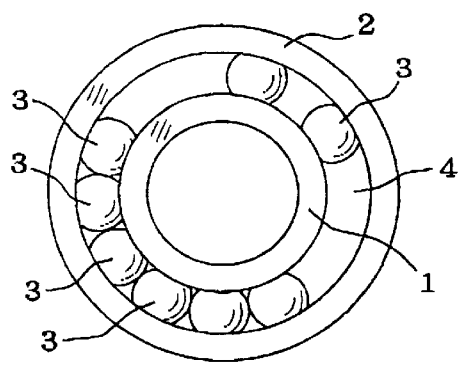
FIGS. 7 (A) and 7 (B) are a front elevational view of a ball bearing, before and after arranging the balls with a uniform space, when assembling the ball bearing.
Figure 7:
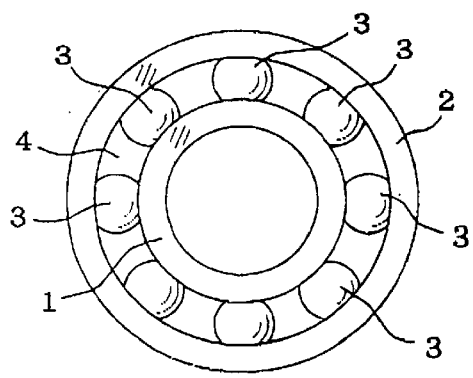

Next, FIG. 6 shows a fifth example of embodiment of this invention, correspondent to the first and second features. The apparatus for arranging balls circumferentially with a uniform interval in this example of embodiment, is different with respect to the fourth example of embodiment, in that the third nozzles 15a for spouting the compressed air in the axial direction of the ball bearing 16, the number of which is equal to the number of the balls 3, are added in the disturbance plate 12, In arranging the balls 3 circumferentially with a uniform interval, the compressed air spouted from each of the nozzles 15*a,* as in the fourth example of the prior art method shown in FIG. 12 mentioned above, cooperates with the nozzles 6*a* provided below the ball bearing 16 to arrange the balls 3 with a uniform interval. In this example of embodiment, as the second nozzles 23, which are sloped in the circumferential direction, are provided in the disturbance plate 12, the separation of the balls 3 is promoted and the balls 3 are smoothly separated from each other.

Further, this example of embodiment is, with respect to the point that the smooth separation of the balls 3 is secured by the second nozzles 23, similar to the fourth example of embodiment and, with respect to the point that the uniform arrangement of the balls 3 is efficiently conducted by the cooperation of the nozzles 15*a,* 6*a* provided above and below, similar to the fourth example of the prior art method in FIG. 12.

Further, the number of the nozzles 15*a,* 6*a* provided above and below is the same to that of the balls 3 and the start and stop of supply for the compressed air are independently controlled by each of the nozzles 15*a,* 6*a*.

Further, it is required that the nozzles 15*a* and the second nozzles 23 assembled into the disturbance plate 12 of the apparatus for arranging the balls circumferentially with a uniform interval in this example of embodiment must not be interfered with each other (the compressed air flowing inside is independent from each other). For this purpose, in the disturbance plate 12, pipes previously formed in a shower-shape are embedded, or this disturbance plate 12 is constructed in a integrated layer structure.

And, with the examples illustrated and explained, the compressed air is spouted from each of those nozzles for making the stream of the compressed fluid by each of the nozzles. Spouting the compressed air is preferred in getting large dynamical pressure and large force for moving the balls, but in the case where the force, which is required for moving the balls, is limited, it is possible that air is attracted through the tip opening of the nozzle close to the ball, so that the stream caused based on the negative pressure is used to move the balls. Furthermore, it is possible that the compressed air is spouted from some of nozzles, while air is sucked from the other nozzles.

In this invention, the method and apparatus for arranging the balls circumferentially with a uniform interval in a ball bearing, constructed and operated as mentioned above, the ball is not hurt, and the foreign matter is not involved in arranging the balls, so that the function is stabilized and the ball beating superior in durability is produced. Moreover, when a plurality of balls have gathered, the separation of the balls is easily and smoothly conducted, then with the efficient arrangement of the balls, the manufacturing efficiency of the ball bearing is improved. Accordingly, the automated assembling of the ball bearing is stably conducted and, the energy saving in the factory leads to the reduced cost in manufacturing the ball bearing.

What is claimed is:

1. A method of arranging balls circumferentially with a uniform interval in a ball bearing comprising:

providing an inner ring and an outer ring independently supported in a relative displacement manner such that the inner ring and the outer ring can be independently moved by rising, falling, rotating and rocking, placing a plurality of balls in an annular space between an inner ring raceway on an outer peripheral surface of the inner ring and an outer ring raceway on an inner peripheral surface of the outer ring, placing a nozzle device beside and independent from at least one of the inner ring and the outer ring, the nozzle device having nozzles the number of which is the same to that of the balls, arranged at uniform intervals, making each of the nozzles face the opening on one side of the annular space between the inner ring raceway and the outer ring raceway, causing a stream of fluid by each of the nozzles to make the balls move circumferentially, so that the balls are arranged circumferentially with a uniform interval, wherein when the stream of fluid is caused by each of the nozzles, one of the inner and outer rings is relatively displaced with reference to the nozzles and the other ring, so that the relationship in position between the nozzles and the balls is changed, whereby the balls provided in a close relationship between the inner ring raceway and the outer ring raceway are separated from each other, and whereby the balls are smoothly moved in the circumferential direction.

2. The method of claim 1, wherein the nozzles are independently controlled to supply and stop the stream of fluid.

3. The method of claim 1, wherein the stream of fluid is electromagnetically controlled.

4. The method of claim 1, further providing a disturbance plate above the ball bearing to disturb the stream of fluid.

5. A method of arranging balls circumferentially with a uniform interval in a ball bearing comprising:

providing an inner ring and an outer ring independently supported in a relative displacement manner such that the inner ring and the outer ring can be independently moved by rising, falling, rotating and rocking, placing a plurality of balls in an annular space between an inner ring raceway on an outer peripheral surface of the inner ring and an outer ring raceway on an inner peripheral surface of the outer ring, placing a nozzle device beside and independent from at least one of the inner ring and the outer ring, the nozzle device having first nozzles, the number of which is the same to that of the balls, arranged at uniform intervals, making each of the first nozzles face the opening on one side of the annular space between the inner ring raceway and the outer ring raceway, providing second nozzles to cause a stream of fluid in a direction tilted with respect to the circumferential direction, on the side opposite to the first nozzles with respect to the axial direction of the inner and outer rings with the balls between the first and second nozzles, causing a stream of fluid by each of the first nozzles to make the balls move circumferentially, so that the balls are arranged circumferentially with a uniform interval, causing the stream of fluid from the second nozzles to produce a force to move the balls in the circumferential direction, wherein when the stream of fluid is caused by each of the nozzles, one of the inner and outer rings is relatively displaced with reference to the nozzles and the other ring, so that the relationship in position between the nozzles and the balls is changed, whereby the balls provided in a close relationship between the inner ring raceway and the outer ring raceway are separated from each other, and whereby the balls are smoothly moved in the circumferential direction.

6. The method of claim 5, wherein the second nozzles are independently controlled to supply and stop the stream of fluid, so that the stream of fluid is caused sequentially in the circumferential direction.

7. The method of one of claims 1 to 6, wherein the fluid is compressed air.

8. An apparatus for arranging balls circumferentially with a uniform interval in a ball bearing, comprising:

a means for independently supporting an inner ring and an outer ring for the ball bearing in a relative displacement manner such that the inner ring and the outer ring can be independently moved by rising, falling, rotating and rocking, a means for placing a plurality of balls in an annular space between an inner ring raceway on an outer peripheral surface of the inner ring and an outer ring raceway on an inner peripheral surface of the outer ring, a nozzle device placed beside and independent from at least one of the inner ring and the outer ring, and having nozzles the number of which is the same to that of the balls, arranged at uniform intervals, the nozzles arranged to face the opening on one side of the annular space between the inner ring raceway and the outer ring raceway, a means for causing a stream of fluid through each of the nozzles to make the balls move circumferentially, wherein when the stream of fluid is caused through each of the nozzles, one of the inner and outer rings is adapted to be relatively displaced with reference to the nozzles and the other ring, so that the relationship in position between the nozzles and the balls is changed.

9. The apparatus of claim 8, wherein the means for independently supporting the inner ring and the outer ring comprises an inner ring mount block and an outer ring mount block, such that the inner ring mount block is surrounded by the nozzle device and the outer ring mount block in a concentric relationship with each other, and that the inner ring mount block and the outer ring mount block are adapted to independently rise, descend, rotate and rock, and that the nozzle device is adapted to independently rise and descend.

10. The apparatus of claim 8, further comprising a control means for combining the movements of the inner ring mount block, outer ring mount block and nozzle device in a predetermined manner.

11. The apparatus of claim 8, wherein the means for causing the stream of fluid has a conduit and an electromagnetic valve provided in the conduit, wherein the electromagnetic valve adapted to control the stream of fluid.

12. The apparatus of claim 11, wherein the number of nozzles is the same to the number of balls to be arranged.

13. The apparatus of claim 11, wherein the number of nozzles is the same to a multiple of the number of balls to be arranged.

14. The apparatus of claim 8, wherein the means for independently supporting the inner ring and the outer ring comprises an inner ring mount block and an outer ring mount block, such that the ball bearing is adapted to be placed on the blocks and a disturbance plate is provided above the ball bearing placed in the blocks, and adapted to rise, descend, rotate and rock.

15. The apparatus of claim 14, wherein the disturbance plate has at least one nozzle for spouting the fluid.

16. The apparatus of claim 15, wherein the nozzle device and the disturbance plate have a conduit and an electromagnetic valve in the conduit, such that the nozzle device and the disturbance plate are related with each other in timing for spouting the fluid.

17. An apparatus for arranging balls circumferentially with a uniform interval in a ball bearing, comprising:

a means for independently supporting an inner ring and an outer ring for the ball bearing in a relative displacement manner such that the inner ring and the outer ring can be independently moved by rising, falling, rotating and rocking, a means for placing a plurality of balls in an annular space between an inner ring raceway on an outer peripheral surface of the inner ring and an outer ring raceway on an inner peripheral surface of the outer ring, a nozzle device placed beside and independent from at least one of the inner ring and the outer ring, and having nozzles the number of which is the same to that of the balls, arranged at uniform intervals, the nozzles arranged to face the opening on one side of the annular space between the inner ring raceway and the outer ring raceway, a means for causing a stream of fluid through each of the nozzles to make the balls move circumferentially, second nozzles for causing a stream of fluid in a direction tilted with respect to the circumferential direction, on the side opposite to the first nozzles with respect to the axial direction of the inner and outer rings with the balls between the first and second nozzles, wherein when the stream of fluid is caused through each of the nozzles, one of the inner and outer rings is adapted to be relatively displaced with reference to the nozzles and the other ring, so that the relationship in position between the nozzles and the balls is changed.

18. The apparatus of claim 17, wherein the nozzle device and the second nozzle have a conduit and an electromagnetic valve in the conduit, such that the nozzle device and the second nozzle are related with each other in timing for spouting the fluid.

19. The apparatus of claim 17, further comprising a means for independently control the second nozzles for supply and stopping the stream of fluid so as to change the spouting sequentially in the circumferential direction.

20. The apparatus of claim 17, wherein the disturbance plate is provided with nozzles in the axial direction, the number of which is the same to that of balls to be arranged.

21. The apparatus of one of claims 8 to 20, wherein the fluid is compressed air.

* * * * *